United States Patent [19]
Gordon et al.

[11] Patent Number: 5,878,915
[45] Date of Patent: Mar. 9, 1999

[54] FLUID FLOW CONNECTOR, FLUID PRESSURE MECHANISM AND PRODUCT TANK LID FOR FLUIDS SUCH AS ADHESIVES

[75] Inventors: Fergal A. Gordon, Kildare; Martin J. Fitzpatrick; Alan T. Crampton, both of Dublin, all of Ireland

[73] Assignee: Loctite (Ireland) Limited, Dublin, Ireland

[21] Appl. No.: 973,074

[22] PCT Filed: Apr. 3, 1997

[86] PCT No.: PCT/IE97/00015

§ 371 Date: Feb. 14, 1998

§ 102(e) Date: Feb. 14, 1998

[87] PCT Pub. No.: WO97/32807

PCT Pub. Date: Sep. 12, 1997

[30] Foreign Application Priority Data

Mar. 4, 1996 [IE] Ireland ...................................... 960204

[51] Int. Cl.⁶ .............................. B67D 5/00; B65D 35/56; B65D 83/00
[52] U.S. Cl. .............................. 222/82; 222/83; 222/83.5; 222/88; 222/105; 222/386; 222/400.7
[58] Field of Search ............................... 222/82, 83, 83.5, 222/88, 105, 386, 400.7; 141/349

[56] References Cited

U.S. PATENT DOCUMENTS

| | | | |
|---|---|---|---|
| 3,589,446 | 6/1971 | Bower | 222/82 |
| 4,421,146 | 12/1983 | Bond et al. | 141/349 |
| 4,886,189 | 12/1989 | Vanderjagt | 222/49 |
| 5,303,732 | 4/1994 | Jonsson | 222/5 |
| 5,379,918 | 1/1995 | Goto | 222/82 |

FOREIGN PATENT DOCUMENTS

| | | | |
|---|---|---|---|
| 0 355 943 | 4/1989 | European Pat. Off. | B67D 1/04 |
| 0 579 057 A2 | 1/1994 | European Pat. Off. | A23B 7/005 |
| WO 89/07575 | 8/1989 | WIPO | B37D 5/44 |
| WO 92/19528 | 11/1992 | WIPO | B67B 7/86 |
| WO 94/20406 | 9/1994 | WIPO | B67D 1/07 |
| WO 95/20540 | 8/1995 | WIPO | B67D 1/04 |

Primary Examiner—Andres Kashnikow
Assistant Examiner—Keats Quinalty
Attorney, Agent, or Firm—Steven C. Bauman

[57] ABSTRACT

A disconnectable flow connector for connecting a fluid-containing flexible bag (1) to a fluid supply line (100) is sufficiently airtight so as to allow dispensing of fluids, especially adhesives, which are highly reactive on contact with even the least quantity of air. The bag (1) has a spout (2, 3) with a pierceable membrane (5). A valve (10) has a tapering end which can pierce and then seal the membrane, an aperture (13) at the tip, and a valve plunger (14) operable so as to be retractable from the aperture (13) to an open (fluid flow) position independently of the piercing action. A fluid pressure mechanism is provided for driving fluid from the flexible bag (1) through the flow connector to the fluid supply line (100). The mechanism consists of a housing (30,31,32,33) for containing the bag (1) and a housing end wall (34) which is moveable along the length of the housing. The bag (1) has no tendency to collapse or fold in on itself. The position of the moveable end wall (34) is an indication of the state (empty, full) of the bag (1). Also provided is a lid for a product tank including an upper face (301), a lower face (302) and a plurality of sides (300), the sides (300) being concave and the intersection of the sides (300) defining a corner of the lid, each corner being provided with a hook-shaped ring (303) which defines a slot (304) into which studs on the product tank can be received.

8 Claims, 15 Drawing Sheets

SECTION X-X

FLUID FLOW CONNECTOR, FLUID PRESSURE MECHANISM AND PRODUCT TANK LID FOR FLUIDS SUCH AS ADHESIVES

FIELD OF THE INVENTION

The present invention relates to a disconnectable flow connector for connecting a fluid-containing flexible bag to a fluid supply line, comprising in combination: a spout for mounting on the flexible bag; a valve of the kind comprising a valve housing and plunger, for mounting on the end of the fluid supply line; sealing means for providing a seal between the valve housing and spout; and fluid communication means to allow fluid communication between the interior of the flexible bag and the interior of the valve housing.

The present invention also relates to a pressure mechanism for driving fluid from a flexible bag consisting of a housing for the bag and pressure application means for applying external pressure to the outer surface of the bag in the housing.

The invention also relates to a lid for a product tank having connections at the corners to engage studs on the tank and inwardly curved sides which facilitate removal of the lid from the tank.

The flow connector, pressure mechanism and lid of the invention are hereinafter described with reference to their utility in relation to air activatable adhesives, but it should be understood that the flow connector, the pressure mechanism and the lid may be used in relation to a very wide variety of fluids.

Brief Description of the State of the Technology— Flow Connector

Commonly assigned European Patent Application No. 92301899.8 entitled "Air Activatable Polymerizable Compositions" describes novel compositions suitable for use as one component systems for forming polymers, requiring no primers. These compositions are useful as adhesives, sealants, surface coatings, moulding resins and composite matrices, for example. These compositions are particularly suitable for use as thread locking compounds e.g. for cementing nuts to threaded shafts, bushes to bush housings and the like. A characteristic of these novel compositions is rapid curing on contact with even the least quantity of air. This characteristic is particularly useful for automated mass production assembly using robots, whereby a composition may be applied as an adhesive to bond two assembly components together, and little curing time is required, so that high production volumes may be achieved. The exceptionally high reactivity of these compositions requires that storage, dispensing and application of the compositions be carried out using equipment which has been sealed to a very high degree against any ingress of air or other gases.

Ingress of air or other gases into a storage, dispensing and application system has two disadvantages. Firstly, air may activate or partially activate the liquid adhesive causing local thickening of the liquid adhesive which is undesirable and causing components which should be relatively movable to bond together. Secondly, there is the possibility that a gas may not activate the liquid adhesive in which case, during application of liquid adhesive, a bubble of gas may become entrained in the flow of liquid and be applied through an applicator to a surface to be bonded, with possibly serious effects on the quality of the bond produced.

Attempts to apply the novel compositions using existing applicators have resulted in premature curing within the applicators, causing the applicators to become blocked. Such premature cure is unacceptable for automated manufacture. The curing occurs because of the ingress of small quantities of air into the applicator, for example at joints or seals, through tubing with poor barrier properties, or through membranes such as bellows or diaphragms. Also, curing occurs in the applicator nozzle downstream of the valve, if the applicator includes this feature. We have overcome these problems by the invention of an applicator which is sealed to a very high degree and which is the subject of commonly assigned Irish Patent Application No. 940697, the disclosure of which is hereby expressly incorporated herein by reference.

For storage it has been found that a highly desirable piece of equipment is a single-use (disposable) flexible airtight bag housed within a rigid container. The compositions can be dispensed from the bag through a flow connector along a liquid supply line to the applicator. When the bag is empty, it is disconnected from the fluid supply line and discarded and a full bag is then connected to the fluid supply line. DE 44 41 414 A1 to Henkel KGaA, describes a system of this kind but does not describe in any detail the flow connector or applicator.

Turning now to flow connectors, U.S. Pat. No. 4,421,146 to Bond et al. describes a flow connector for use in a beverage dispensing system or the like for connecting a service line to a single-service coupling and dispensing spout valve on a flexible bag containing a liquid or semi-liquid product to be dispensed. The Bond et al. flow connector comprises a clamp which permits quick application to and quick removal from the spout. The clamp carries a guide structure for a nozzle body. The nozzle body is capable of axial movement relative to the spout for insertion into the spout so as to push a spout valve member from a closed into an opened position. The nozzle body simultaneously grips the spout valve member so that, as the nozzle body is withdrawn, it moves the spout valve member again into closed position. In the nozzle body is a normally-closed flow control valve which is positively opened when the nozzle body is inserted into the spout and which is automatically closed as the nozzle is withdrawn from the spout.

Attempts to dispense the novel compositions from a bag using a flow connector as described in Bond et al. have resulted in premature curing. In particular we found that the two principal parts of the spout, namely the spout fitment which is fitted to the bag, and the spout valve member which telescopes therein, became bonded to one another. Bonding took place between the two mutually slidingly engaging surfaces, that is to say the inner surface of the spout fitment and the outer surface of the spout valve member, and took place over substantially the entire area of mutual contact.

It is not known precisely how the air entered the flow connector, but one possibility is that air passes through the components which are made of low density polyethylene which has poor barrier properties.

A further possibility for air ingress arises from the structure of the Bond et al. flow connector. The nozzle body is of generally cylindrical shape, but with a hemispherical end. The spout, in particular the spout body, has a corresponding geometry. A seal between the two is provided by means of an external circumferential O-ring on the cylindrical part of the nozzle body. As the nozzle body enters the spout, in the initial stages of movement a seal is formed between the cylindrical surfaces of the nozzle body and spout, thus trapping a cushion of air in the dead space in front of the end of the nozzle body. Further movement of the nozzle body into the spout compresses the trapped air, raising the pressure thereof. Still further movement causes the valve in the nozzle body to open against the spring pressure. Finally, the spout valve member telescopes into the spout, allowing access to the flexible bag.

Once air has entered a flow connector as described in Bond et al., in whatever manner, then because of the number of components in the flow connector and the extent of surface contact between these components, the air is likely to cause not merely local thickening (which is in itself undesirable) but also to cause the flow connector to seize up.

A further disadvantage of the flow connector as described in Bond et al. arises from the combined operations of securing the flow connector to the spout and establishing fluid communication between the interior of the flow connector and the interior of the flexible bag. Accordingly, in order to close off such fluid communication it is necessary to disconnect the flow connector from the flexible bag.

A still further disadvantage of the Bond et al. arrangement is that the spout, which is discarded with the bag after the latter has been emptied, is relatively complex, for example it includes moving parts.

Fluid Pressure Mechanism

One known fluid pressure mechanism for driving fluid from a flexible bag consists of a pressure vessel for housing the bag, a bag guide within the pressure vessel, and means for generating increased air pressure within the pressure vessel so as to drive fluid from the bag. A flow connector, which is provided on the roof of the bag, is connected via a flexible coiled or spiral hose to a further flow connector in the roof of the pressure vessel. A weight is provided centrally on the roof of the bag for the purpose of maintaining the bag in a generally "expanded" or "inflated" state within the guide. As the bag is gradually emptied and the roof descends correspondingly, the coiled hose unwinds, thus maintaining the flow path between the flow connector on the roof of the bag and the flow connector in the roof of the pressure vessel.

A disadvantage of the fluid drive mechanism described above is that a fold of the bag may snag on the guide within the pressure vessel thereby preventing the weight moving downwardly and possibly damaging the bag. Another disadvantage of the fluid drive mechanism described above is that in use, with the bag contained within the pressure vessel, the user cannot monitor the changing state (full to empty) of the bag and an interruption in liquid flow may be the first indication that the bag is empty. A further disadvantage is that a considerable proportion of the air pressure generated is used to drive the fluid along the coiled flexible hose. Clearly this arrangement is not satisfactory for production line purposes.

U.S. Pat. No. 4,886,189 to Vanderjagt discloses a device for containing and dispensing fluids comprising a housing and a flexible or rolling type diaphram, the diaphram containing the fluid and being moveable by an actuator so that fluid is dispensed from the housing. In essence the device comprises a rolling bellows and is useful with a package which is not flexible or disposable. The package is a rigid vessel which can withstand internal pressure i.e. it is a form of pressure pot with an in-built bellows which would not be suitable for use to dispense from a plastic bag, which is the container used for many adhesives and similar components. The rolling area of the diaphram would create an unsupported area of a plastic bag which would cause the bag to burst in operation of the device.

EP-A-0 579 051 discloses a system for aseptically emptying flexible containers, such as bags, for sterile foodstuffs comprising a housing having a cover with a pressing means to compress the bag and thereby expel the contents. The foodstuffs are liquid and pastry foodstuffs, but it is not evident that the device could be used to dispense anaerobic or air-sensitive adhesives. The device has the further limitation that it relies on mechanical pressure alone to expel the contents of the bag. This limits the pressure which can be put on the bag since increasing mechanical pressure will eventually burst the bag.

SUMMARY OF THE INVENTION

Accordingly, one aspect of the present invention provides a disconnectable connector suitable for use in connection with the novel air activatable polymerizable compositions, in other words a connector sealed to a very high degree against the ingress of air.

The invention provides a disconnectable flow connector for connecting a fluid-containing flexible bag to a fluid supply line comprising in combination:

a spout for mounting on the flexible bag;

an outlet valve of the kind comprising a valve housing and plunger, for mounting on the end of the fluid supply line;

sealing means for providing a seal between the valve housing and spout;

and fluid communication means to allow fluid communication between the interior of the flexible bag and the interior of the valve housing;

characterized in that the spout includes a membrane which is pierceable to allow fluid communication with the interior of the flexible bag;

the outlet valve has a tip capable of piercing the membrane upon movement of the outlet valve into the spout;

the valve housing has a tapering end which can seal the pierced membrane and has an aperture at said end to allow fluid to flow from the flexible bag into the valve housing;

the valve plunger is movable between a forward closed position in which it plugs the aperture thus preventing fluid from entering the valve housing and an open retracted position in which it allows fluid to enter the valve housing;

and valve plunger activation means are provided which may be operated independently of the relative movement or position of the outlet valve and spout.

In operation the outlet valve and spout are caused to undergo relative movement towards one another, the valve plunger being in the closed position during such movement. The tip of the outlet valve pierces the membrane of the spout. The tapered end of the valve housing provides a seal in the form of a line contact between the valve housing and the pierced membrane. When it is desired to allow liquid flow, the valve plunger is retracted to the open position, and liquid can then flow from the flexible bag through the aperture into the interior of the valve housing. When liquid flow is not desired the valve plunger is moved back to the closed position.

The arrangement described above presents a number of advantages. Firstly, the spout and the outlet valve make contact with one another only along a line of contact where the tapering valve housing penetrates the membrane. If bonding takes place, the bond can be more easily broken than a bond between two overlapping areas of surface contact. In contrast, the Bond et al. arrangement includes substantial overlapping areas of surface contact where bonding can take place. Secondly, the seal between the spout and the outlet valve is constituted by close mating of components. Accordingly there is no gap or "dead space" in which air can be trapped between seal and contact, as was the case in the Bond et al. arrangement. Thirdly, the step of connecting the outlet valve to the spout and the step of allowing fluid communication have been separated, the valve may remain closed while secured to the spout and may be opened only as and when fluid flow is required. Fourthly, the part of the flow connector which is attached to the disposable flexible bag and which is discarded with the bag consists of relatively simple components, and in particular does not include any moving parts, unlike the Bond et al. arrangement in which the spout includes a movable spout valve member.

The membrane may include a weakness or weakened portion to facilitate piercing.

The membrane may include a hinge so that on being pierced the elements of the pierced membrane are deflected towards the interior of the bag.

The valve plunger may include a tip which in the closed position projects through the aperture at the end of the valve housing.

The tapering end of the valve may be conical and the spout may include a conical seat for the end of the valve with the membrane extending across the base of the seat, the angle of taper of the seat being very slightly greater than the angle of taper of the end of the valve.

Another aspect of the present invention provides a fluid pressure mechanism suitable for use in industrial applications, in particular a mechanism which ensures that the entire contents of the bag may be emptied without interruption and that the state of the bag is known so that as the bag is about to become empty it can be discarded and replaced.

This aspect of the invention provides a fluid pressure mechanism for driving adhesive from a flexible bag having a spout, the mechanism including a housing for the bag, a spout retaining means, a spout piercing means and pressure application means for applying external pressure to the outer surface of the bag in the housing. The pressure application means may comprise a housing end wall which is moveable along the length of the housing and a drive means for driving said end wall.

A further aspect of the invention provides a dual pressure mechanism which allows the limits of mechanical pressurisation to be overcome. This is achieved by using both mechanical and air pressurisation, which combination does not burst the adhesive bag.

The invention provides many advantages. Firstly, the bag will have no tendency to collapse or fold in on itself, the movement of the moveable end wall along the housing during emptying of the bag ensures that the bag is maintained at all times in the "expanded" state, conforming to the internal shape of the enclosed volume of the housing. Secondly, the location of the moveable end wall along the length of the housing is a clear measure of the state (e.g. full, empty) of the bag.

The drive means and housing end wall may provide the entirety of the pressure for driving fluid from the bag. The advantage of this arrangement is that the use of a pressure vessel is unnecessary. Use of a pressure vessel containing air under pressure involves meeting stringent safety requirements which vary from country to country.

The housing may be surrounded by a pressure vessel and means may be provided for generating an increased pressure within the pressure vessel so as to assist in driving the contents from the bag. Alternatively, the housing itself may constitute the pressure vessel.

A flow connector may be provided on the bag mounted in a housing end wall.

The drive means may comprise a ram which may be powered pneumatically, hydraulically or otherwise.

Measurement means may be provided on the ram to measure the movement of the piston and signalling or indication means may also be provided to signal or indicate the results of the measurement.

The spout retaining means may comprise a pair of retaining members which fit together to form a collar which engages the spout of the bag, the collar being located within the housing. The retaining members may be a sliding fit together.

The spout piercing means may comprise a pointed tubular element which is moveable between a piercing position and a retracted position in which it does not pierce the spout, the tubular element being held in a collar connectable with the lid of the pressure mechanism.

A still further aspect of the invention provides an improved lid of the pressure mechanism, which can be sealed easily and simply and allows the lid to conform to normal pressure vessel standards.

In this aspect of the present invention a lid or cover is provided which is engageable with a plurality of studs, the lid including an upper face, a lower face and a plurality of sides characterised in that the sides are concave and that the intersection of the sides defines a corner of the lid, each corner being provided with a hook-shaped ring which defines a slot into which the studs are receivable.

BRIEF DESCRIPTION OF THE DRAWINGS

The invention will now be described more particularly with reference to the accompanying drawings illustrating an embodiment of a disconnectable flow connector according to the invention. In the drawings.

DETAILED DESCRIPTION OF THE INVENTION

Figure 1:
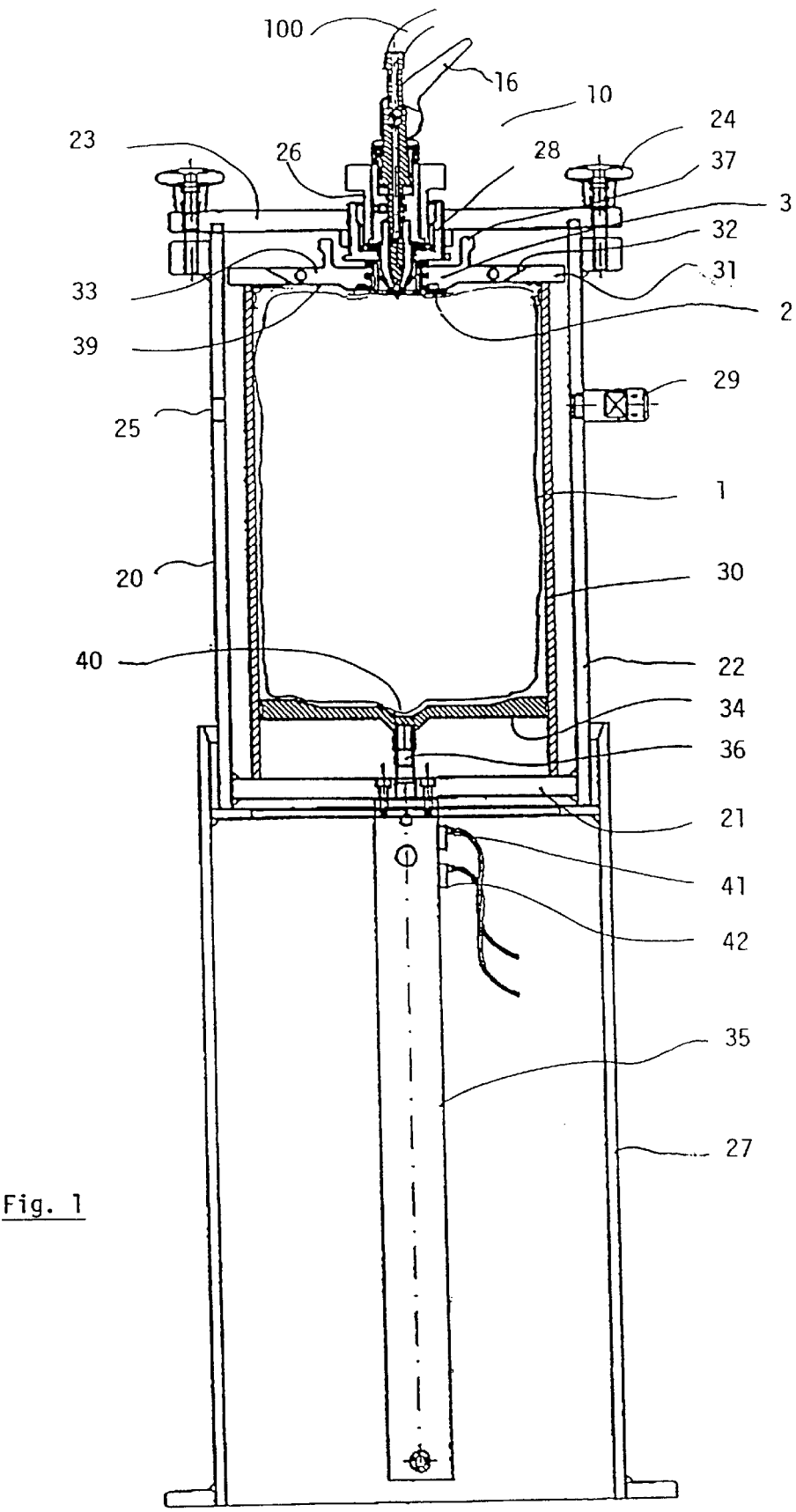
FIG. 1 is a sectional front elevation of the flow connector in combination with one embodiment of a pressure mechanism.

Referring initially to FIGS. 1 to 5, an airtight flexible bag 1 (shown in FIG. 1) contains adhesive to be dispensed. As seen in FIGS. 2A, 2B, 2C and 5 the bag 1 is provided at the upper end thereof with an outlet including a collar 2 and plug 3 which together define a spout. The plug 3 includes a tapered valve seat 4 in the mouth of the spout, and a pierceable impermeable membrane 5 extending across the base of the tapered seat 4.

An outlet valve generally designated 10 is attached to the end of a fluid line 100. The valve 10 co-operates with the bag outlet to allow fluid flow from the bag 1 to the fluid line 100 and on to an applicator (not shown). As seen in FIGS. 2A, 2B, 2C and 5 the valve 10 includes of a valve housing 11 having a conical lower end 12 and inlet aperture 13 and a valve plunger 14 located generally within the housing but having a tip 15 which in the closed position of the plunger projects through and seals the aperture 13 and which may be used to pierce the membrane 5. The valve 10 has a lever 16 which may be operated to allow fluid flow through the valve.

The adhesive in the bag 1 is maintained under pressure by subjecting the outer surface of the bag 1 to pressurized air. A pressure pot (see FIG. 1) for containing air under pressure is generally designated 20 and includes a base 21, a cylindrical side wall 22, a lid 23, bolts 24 for securing the lid 23 in position, and an air inlet 25 in the side wall 22 for admitting and venting air under pressure. A central aperture in the pressure pot lid 23 receives a fixed outer collar 28 which is a screw fit therein. The position of the collar 28 may be adjusted as desired before use, and the collar 28 may then be fixed in position by means of lock nut 28a. A moveable central collar 26, including the valve 10, is screw-fit in fixed collar 28, the latter providing a bottom stop 28b which limits the extent to which movable collar 26 may be moved downwardly into the pressure pot 20. Valve 10 is freely rotatable within moveable central collar 26 and is prevented from being withdrawn upwardly by shoulder stop 26a of the moveable central collar 26 and is prevented from falling downwardly by circlip 28c in the fixed outer collar 28. The pressure pot 20 is mounted on a stand 27. In the event of excess pressure, a pressure release valve 29 is provided as a safety feature. The pressure applied is typically about four bars but may be up to about eight bars.

A bag holder is provided located within the pressure pot 20 to correctly align the bag 1 within pressure pot 20 to allow the membrane 5 to be pierced, and to ensure that the bag 1 maintains an appropriate shape as the adhesive is dispensed. The bag holder (see FIG. 1) includes a cylindrical side wall 30 which rests on the base 21 of the pressure pot 20, a lid 31 including an aperture with a bevelled rim 32, and a mating bevelled collar insert 33. A moveable floor 34 engages the lower region of the bag 1 and moves steadily upwards as the bag is emptied. The outer edge of the moveable floor 34 is an interference fit in the cylindrical side wall 30. A floor drive mechanism including a pneumatic cylinder 35 and piston (FIG. 1 does not show the piston itself but shows piston rod 36) moves the floor 34.

Construction of the apparatus is now described. The spout 2, 3 of the bag 1 is fitted to the lid insert 33 of the bag holder. For this purpose the lid insert 33 is formed in two halves 33a, 33b (see FIG. 4) which, when fitted together, provide a collar which engages the spout 3. With the pressure pot 20 open (i.e. lid 23 removed), the bag 1 is introduced into the pressure pot and into the bag holder, with the bevelled rim 32 of the aperture in the lid 31 of the bag holder serving as a seat for the bevelled insert 33, and holding the two parts 33a, 33b together. The pressure pot lid 23 is then put in position on the pressure pot 20, and the bolts 24 are screwed down to close and seal the pressure pot 20.

Figure 2A:
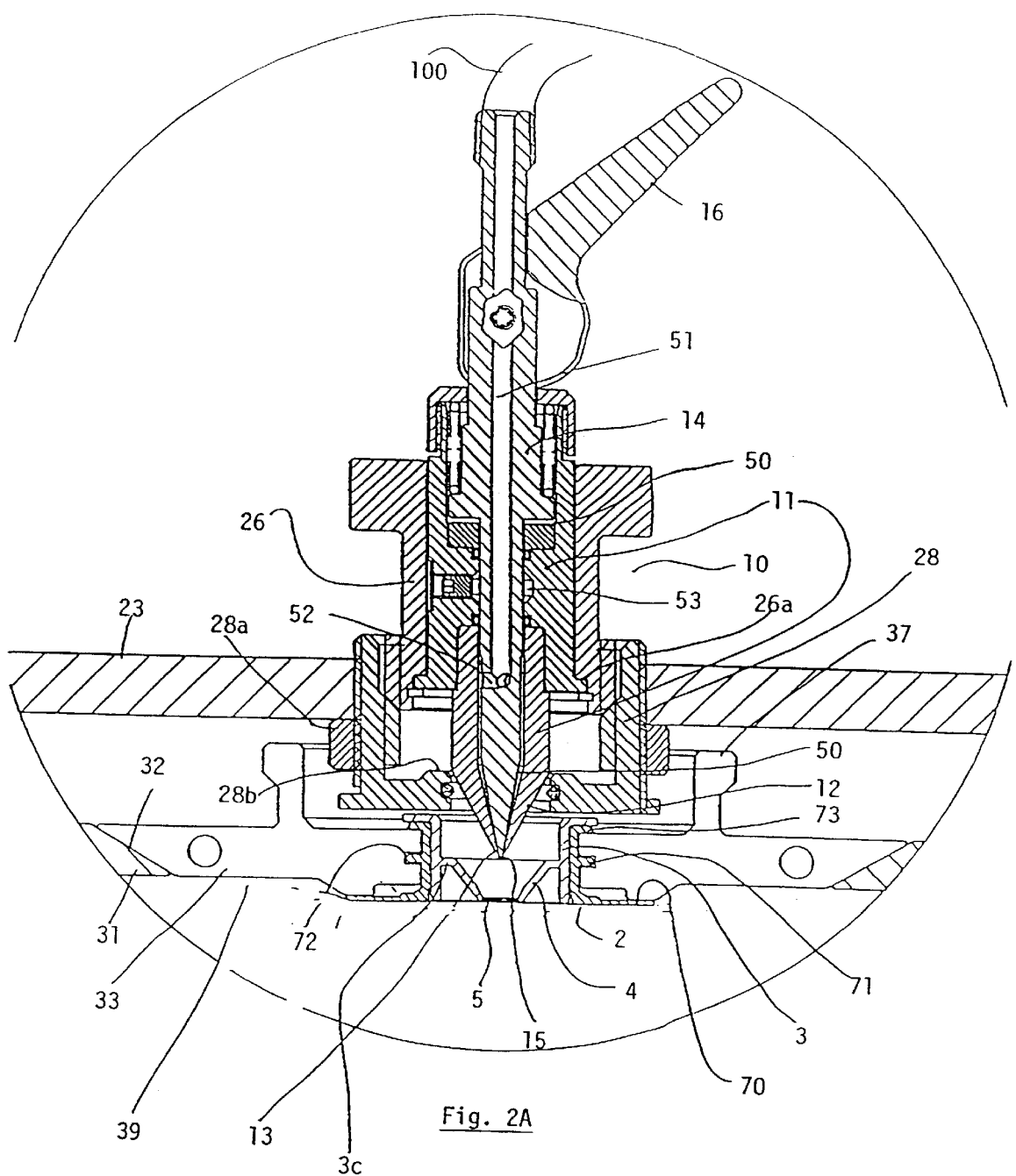
FIGS. 2A, 2B and 2C show a detail of FIG. 1 on a larger scale and at successive stages in the operation of the disconnectable flow connector.
Figure 2B:
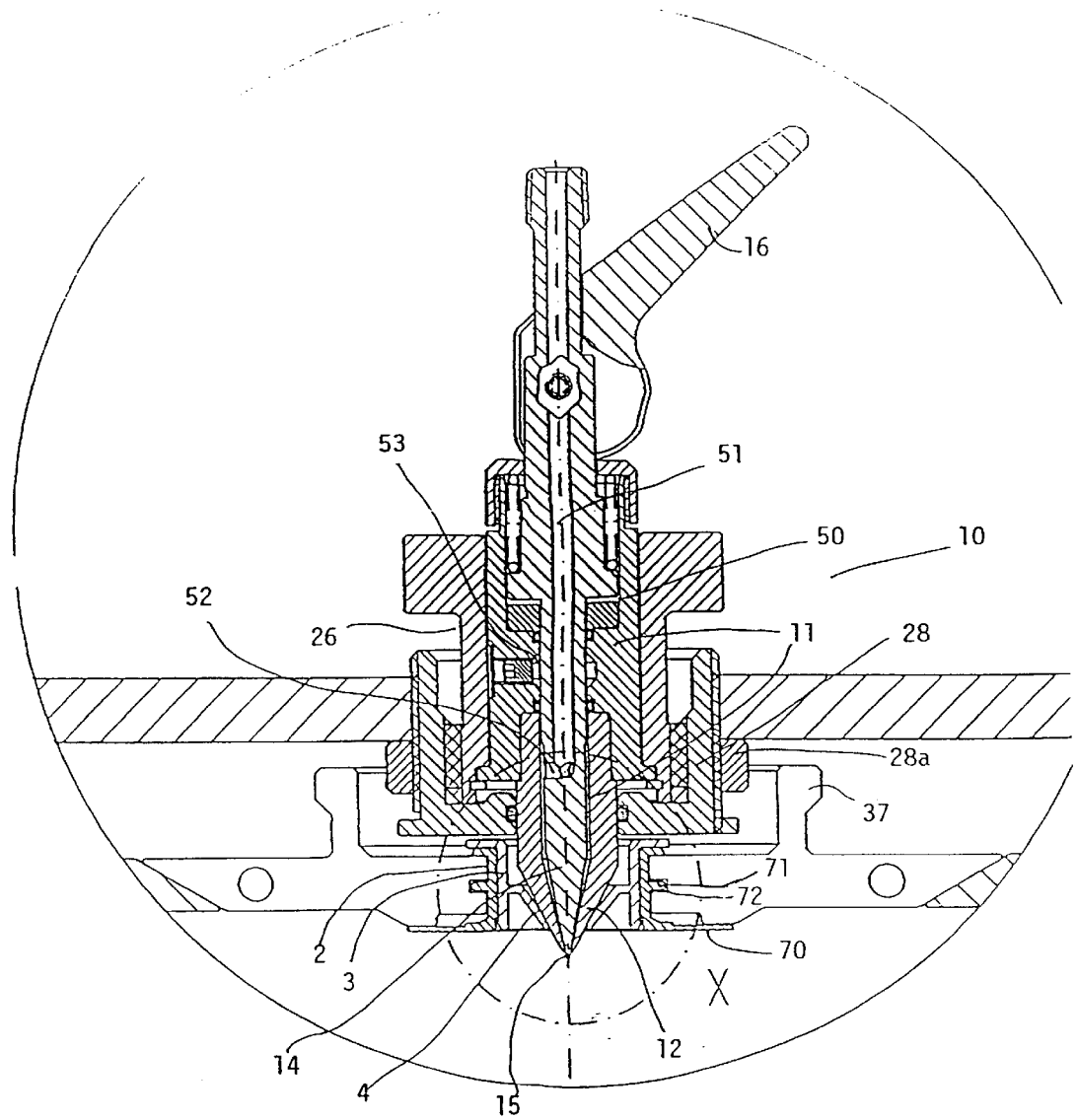
Figure 5:
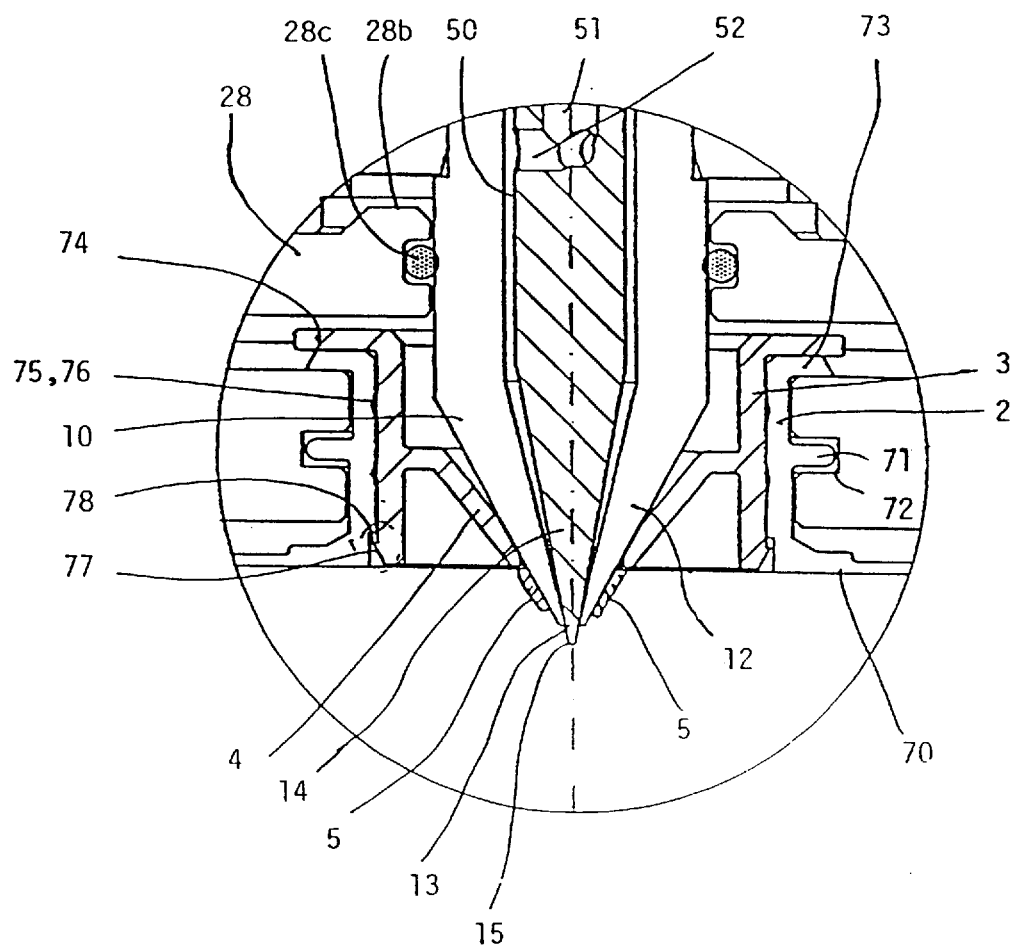
FIG. 5 is a detail of FIG. 2B, as indicated by circular dashed line X, on a much larger scale.

At this stage, as shown in FIG. 2A, the membrane 5 has not yet been pierced and the valve 10 is closed. The moveable collar 26 is then screwed downwardly so that the valve 10 moves gradually downwardly into the spout 2, 3. The bag holder is not constrained from movement in the horizontal direction and the downward movement of the bevelled insert 33 into engagement with the bevelled rim 32 may cause horizontal movement of the latter thus centering the bag holder in the pressure pot 20. At the final stage of this downward movement, as shown in FIGS. 2B and 5, the conical lower end 12 of the valve 10 contacts and then seats into and seamingly engages the tapering seat 4 of the plug 3, and the tip 13 of the valve 10 pierces the membrane 5 so that the conical lower end 12 just penetrates the bag 1. One end of the fluid line 100 is then connected to the upper end of the valve 10, the other end of the fluid line 100 is connected to an applicator (not shown). Air pressure is then applied to the interior of the pressure pot 20 so as to press on the outer surface of the flexible bag 1, so as to force adhesive out of the bag 1. At the same time, the drive mechanism 35, 36 is activated so that the floor 34 of the bag holder exerts a gentle upward pressure on the lower region of the flexible bag 1. As a result the bag 1 adopts and subsequently maintains the well-defined shape of the space in which it is confined. This minimizes residues and thereby prevents blockages arising, such as might arise if the bag were partly collapsed, and also permits trapped gases to flow to a headspace as described in more detail below. The pressure applied by floor 34 is typically about 0.3 bar. Thus far no liquid flow has occurred because the valve plunger 14 is in the forward (closed) position.

Figure 2C:
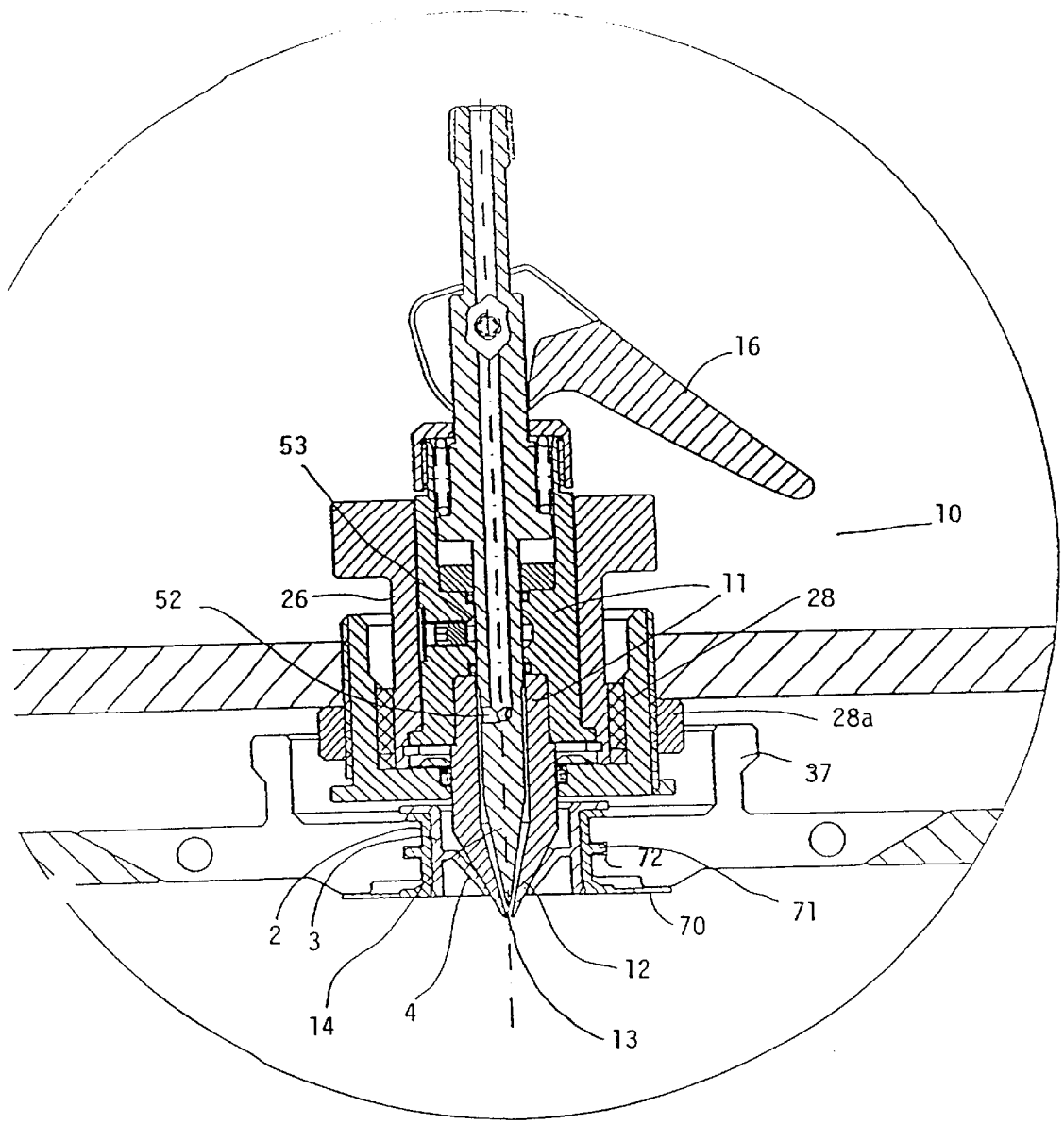

Priming the apparatus is now described below. The applicator is set in the open (liquid application) state. Lever 16 is then operated so that, as shown in FIG. 2C, the valve plunger 14 is retracted into the valve housing 11. Liquid under pressure flows from the flexible bag 1 through the valve 10, along the fluid line 100, and is dispensed from the applicator. This flow should be maintained until all gasses have been purged from the system (the valve 10, fluid line 100 and applicator). When the liquid stops flowing in the system, even a trace of air in the system could activate the stationary liquid adhesive, thereby causing premature curing, or the slightest trace of air or any other gas could be entrained as a bubble which could have negative consequences in use of the apparatus. After all gas has been driven from the system the applicator may be set to the closed (non-application) state. As a result of the foregoing steps, there is a continuum of adhesive under pressure in the flexible bag 1 and in the system. The apparatus is now primed and ready for use.

Use of the apparatus is now described. The applicator is operated either continuously or intermittently to apply adhesive to surfaces as required. Because of the air pressure maintained on the outer surface of the flexible bag 1, adhesive fluid pressure is maintained in the bag 1 and in the system. As further adhesive is applied the contents of the flexible bag 1 gradually diminish. The bag holder movable floor 34, which exerts gentle pressure on the lower region of the bag, gradually moves upwardly, so that the bag maintains its desired shape and does not block the bag outlet as the contents diminish. Use in the manner described above continues until the contents of the flexible bag 1 is nearly exhausted.

In a production line situation it is desirable to know when the bag 1 is nearly exhausted, so that the bag can be replaced without down time in the production process. For this purpose, two magnetically tripped limit switches 41, 42 at the top end of the cylinder 35 co-operate with a permanent magnet (not shown) which is integral with the piston to provide signals indicative of "nearly empty" and "empty".

Two features are provided to ensure that even when the bag 1 is almost totally exhausted, no gases enter the system and the bag 1 does not block the outlet. Firstly, the bag holder lid insert 32 includes a shoulder 39 so that the top of the bag 1, all except the central region thereof, is at a slightly higher level than the pierced membrane 5. As a result, any small residual amount of inert gas remaining in the flexible bag 1 arising from the bag filling operation is trapped near the roof of the bag at a level above that of the pierced membrane 5. Secondly, the movable floor 34 includes a central depression 40 for receiving the centre of the floor of the bag. The primary purpose of the depression is to ensure that when the movable floor 34 is near the upper end of its travel the floor of the bag 1 is not pierced by the tip 15 of the valve plunger 14.

Replacement of an empty bag by a full bag is now described. Initially, the applicator is switched off. The lever 16 is operated to close the valve 10. As a result, the interior of the valve 10, the flow line 11, and the interior of the applicator constitute an airtight system containing adhesive under pressure. The air pressure in the pressure pot 20 is reduced to atmospheric pressure and the pneumatic cylinder and piston are activated to lower the movable floor 34 so that any remaining liquid in the flexible bag 1 is no longer under pressure. The movable collar 26 and valve 10 are then unscrewed from the fixed collar 28, by a certain distance such that when a new flexible bag is being attached the pierceable membrane of the new bag will not be pierced by the valve 10 during attachment. The bolts 24 are undone and the pressure pot lid 23 is removed, thus separating the tip 15 of the valve plunger 14 from the membrane 5 of the empty bag. The insert 33 and empty bag 1 are removed from the pressure pot 23, making use of the annular handle 37 formed integrally with the insert 33. The empty bag 1 is detached from the insert 33 by dividing the latter into its two component halves 33a, 33b, and a full bag is fitted.

The construction of the outlet valve 10 is similar to the construction of the applicator which is described in commonly assigned Irish Patent Application No. 940697. The outlet valve 10 consists of the valve housing 11 which has a bore 50 terminating at one end in outlet aperture 13. The valve plunger 14 is received in the bore 50 and mounted for slidable movement between the open (liquid flow) position and the closed position. In the latter position the tip 15 of the valve plunger 14 seals the valve housing outlet aperture 13. The rear end of the valve plunger 14 projects from the other end of the valve housing 11. The valve plunger 14 itself includes a longitudinal bore 51 for flow of liquid adhesive. The valve plunger 14 is provided with one or more ports 52 through which liquid may flow from the bore 51 of the valve plunger 14 into the bore 50 of the valve housing 11. Lever 16 is provided for moving the valve plunger 14 between the closed position and the open position. A seal 53 is provided between the valve plunger 14 and valve housing 11 to prevent ingress of air. The seal 53 is a liquid barrier seal. In the open position (FIG. 2C) the tip 15 of the valve plunger 14 is retracted into the valve housing 11. When the valve plunger 14 is in the fully open position the bore 50 of the valve housing 11 and the bore 51 of the valve plunger 14 co-operate to provide a streamlined flowpath. All of the foregoing structural features of the outlet valve are present in the applicator which is the subject of the above mentioned Patent Application. However, the flow of adhesive takes place in the opposite direction. Whereas in the applicator of the earlier invention the tip of the plunger serves only to close the conical end of the applicator and the conical end serves as a nozzle for delivering a narrow jet of adhesive, in the outlet valve of the present invention the tip of the plunger serves the additional function of piercing the membrane and the conical end of the housing serves as a seal and serves as an inlet for the adhesive. The only structural difference between the outlet valve of the present invention and the applicator of the earlier invention is that in the present invention the plunger 14 is operated by the manually operable lever 16 instead of by a pneumatic or hydraulic system.

Figure 3:
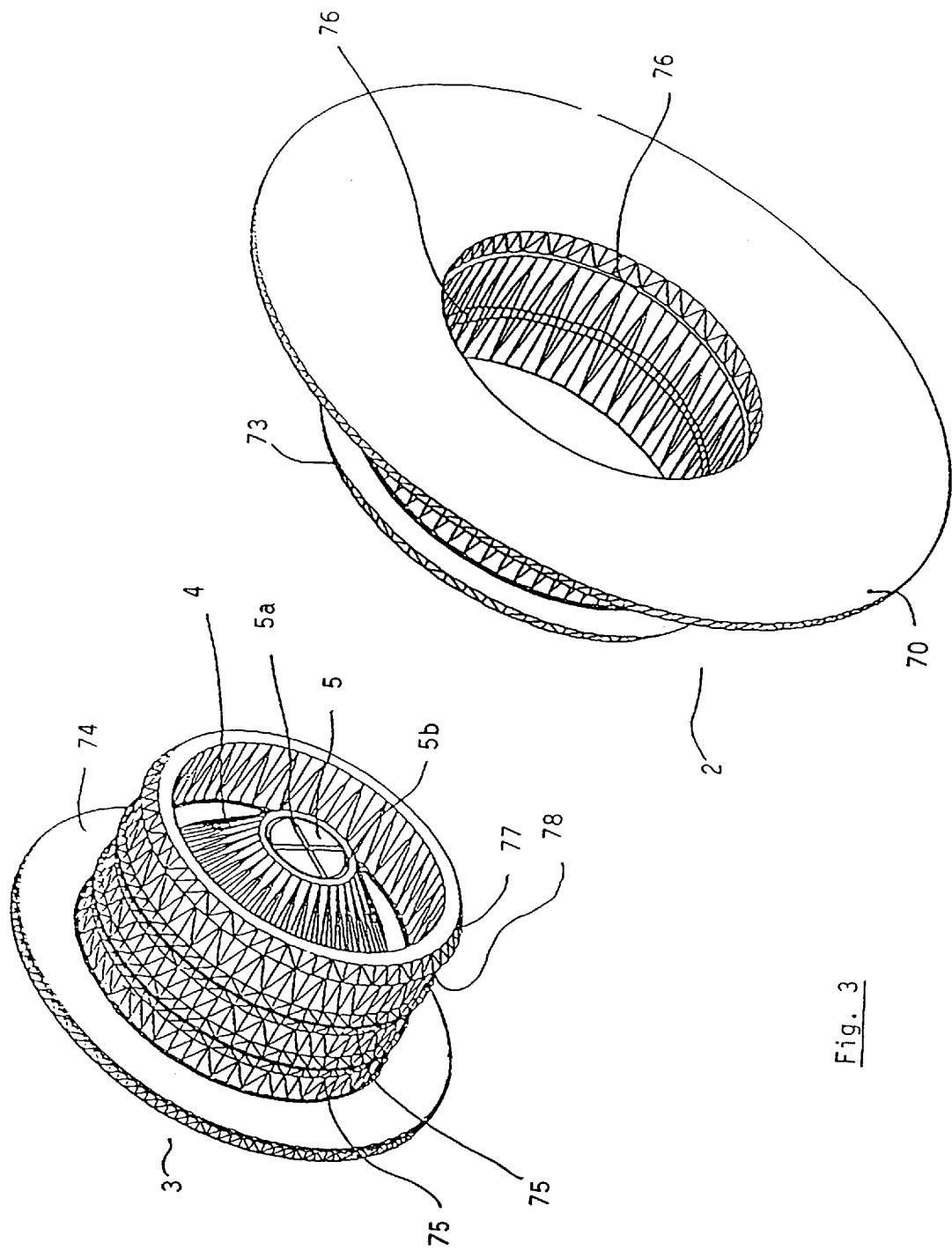
FIG. 3 is an exploded perspective view of the flow connector spout which is constructed of two components and includes the pierceable membrane.
Figure 4:
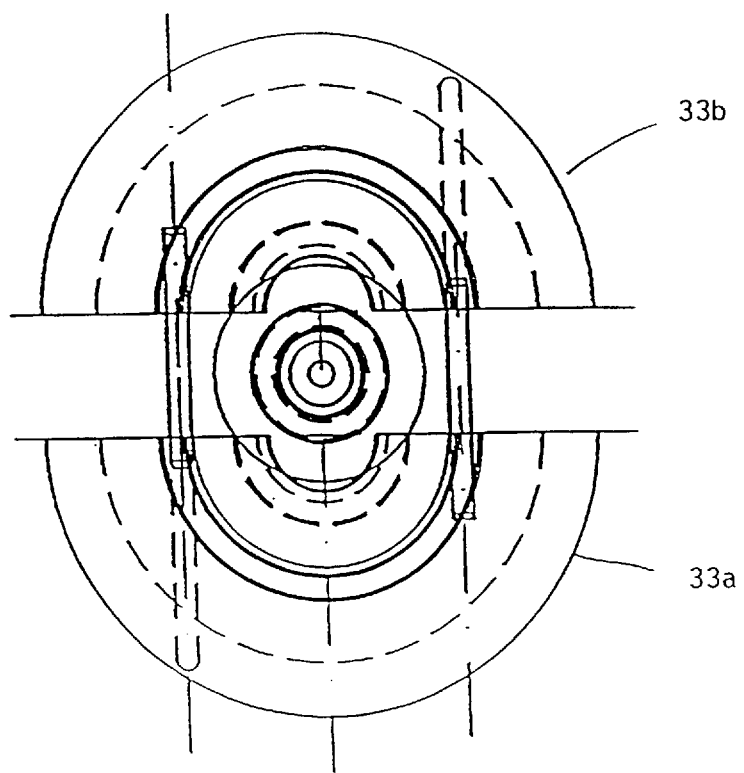
FIG. 4 is a plan view of one component of the flow connector, namely a collar in two halves which may be fitted to the outside of the spout.

Referring now to FIG. 3, as mentioned the spout includes a collar 2 and a plug 3. The collar 2 is a commercially available product. The collar 2 includes a lower flange 70 which is attached to the flexible wall of the bag 1 (not shown in FIG. 3), a circumferential flange 71 (see FIGS. 2A, 2B, 2C) which engages in a corresponding groove 72 in lid insert 33, and an upper flange 73.

The plug 3 is custom made and embodies important features of the invention. The plug 3 is a press fit in the collar 2 and includes an upper flange 74 which engages against upper flange 73 of the collar 2. The plug 3 includes external beading 75 for co-operation with internal grooves 76 in the collar 2 to provide the press fit. The plug 3 has a bevelled lower rim 77 and a circumferential barb 78 to facilitate entry of the plug 3 into the collar 2 during assembly and to prevent subsequent withdrawal. The plug 3 includes the pierceable impermeable membrane 5 and includes a number of features which assist in allowing the membrane 5 to be pierced in a consistent manner and in allowing a good seal to be formed. As seen in FIGS. 2B and 2C, when the valve 10 is moved downwardly to pierce the membrane 5, the tip of the valve pierces the centre point of a cross-shaped weakness 5a, and the membrane 5 divides into four segments each of which hinges downwardly as a result of the provision of a peripheral hinge 5b (see FIG. 3). As seen in FIG. 5 the angle of taper of the tip of the valve 10 is slightly different to that of the tapering seat 4. As a result the tip of the valve 10 engages with the pierced membrane 5 over a narrow annular line of contact or seam.

Figure 6A:
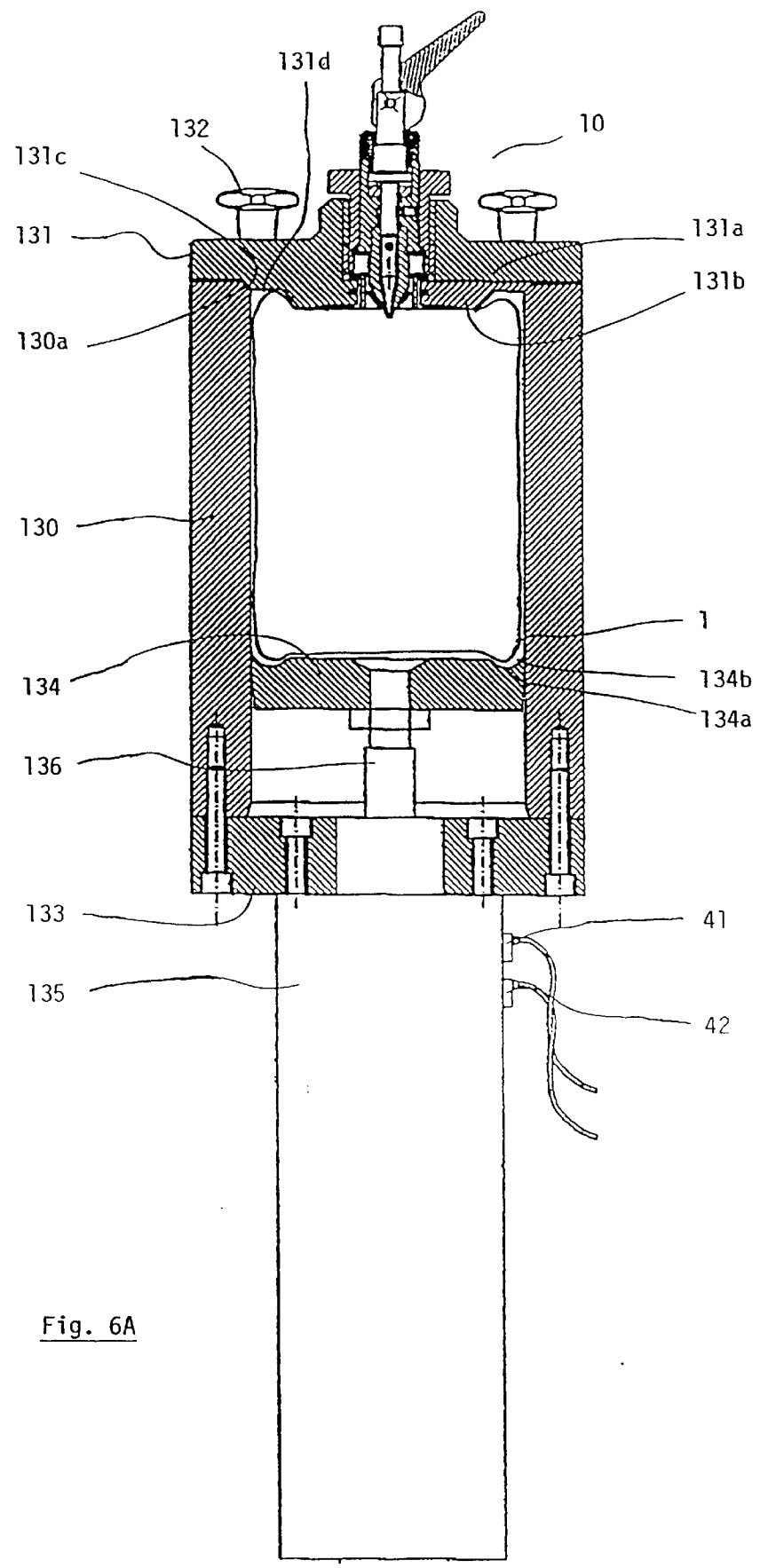
FIG. 6A is a sectional front elevation of the connector in combination with a second embodiment of the pressure mechanism, with the bag full.
Figure 6B:
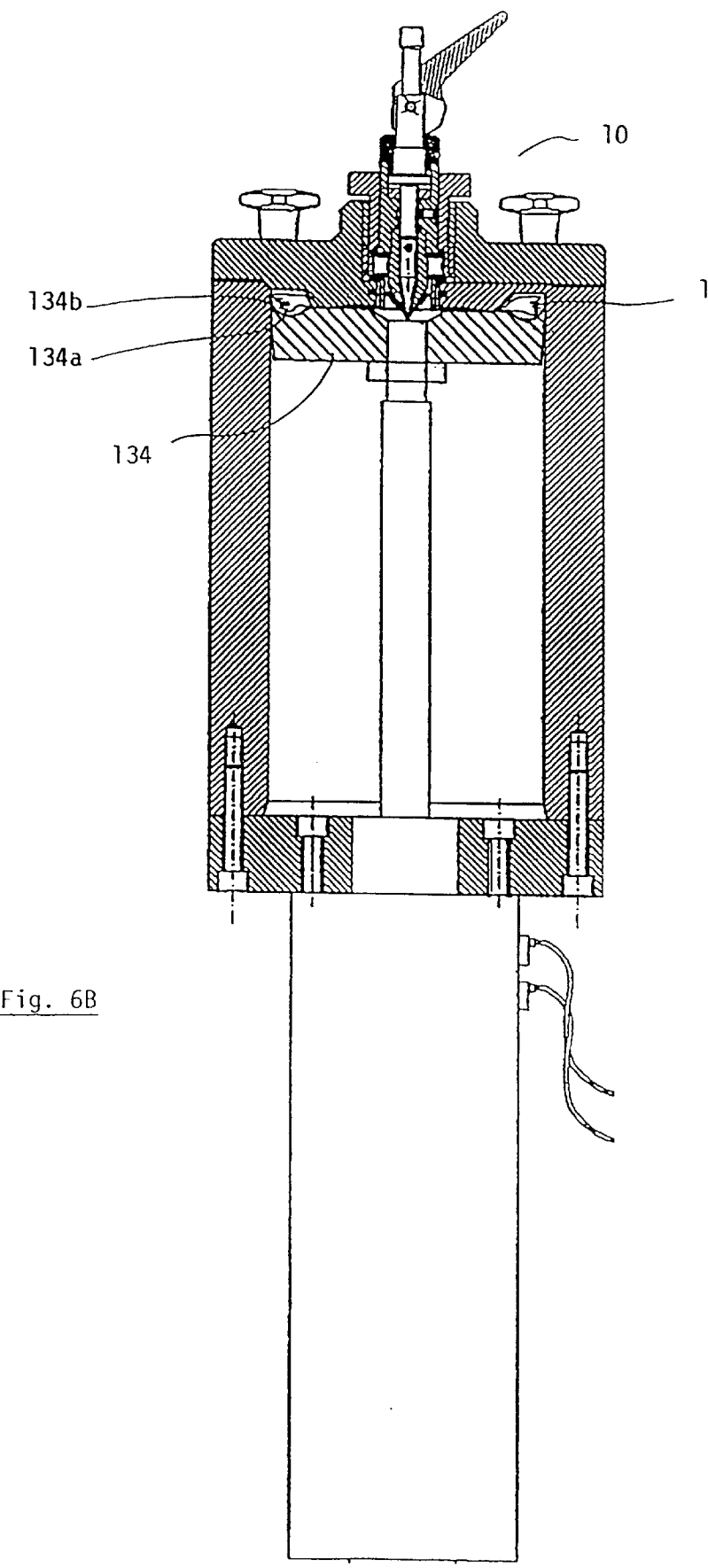
FIG. 6B is similar to FIG. 6A but with the bag empty.

The embodiment shown in FIGS. 6A and 6B differs from that shown in FIGS. 1 to 5 in that a moveable floor applies all of the required pressure to a bag contained in a bag holder and no pressure pot is used.

The bag holder includes of a cylindrical side wall 130, a lid 131 secured in position by four bolts 132, a base 133, a moveable floor 134, and a floor drive mechanism consisting of a pneumatic cylinder 135 and piston including piston rod 136.

Figure 7:
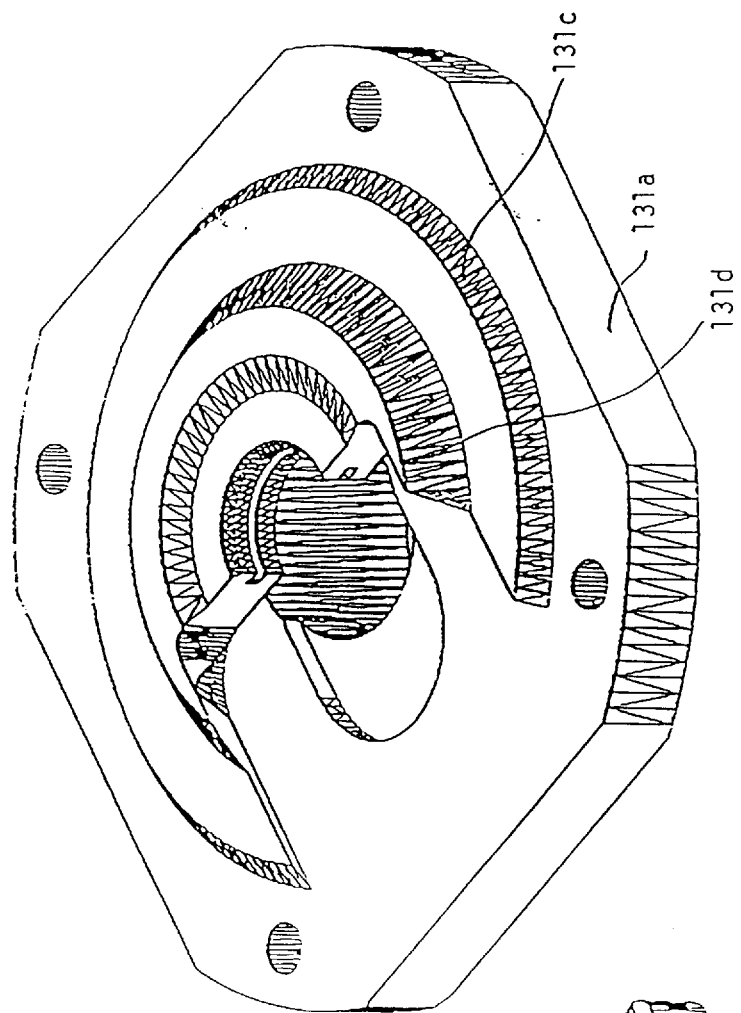
FIG. 7 is a perspective view from below of a component of one embodiment of a pressure mechanism.
Figure 7:
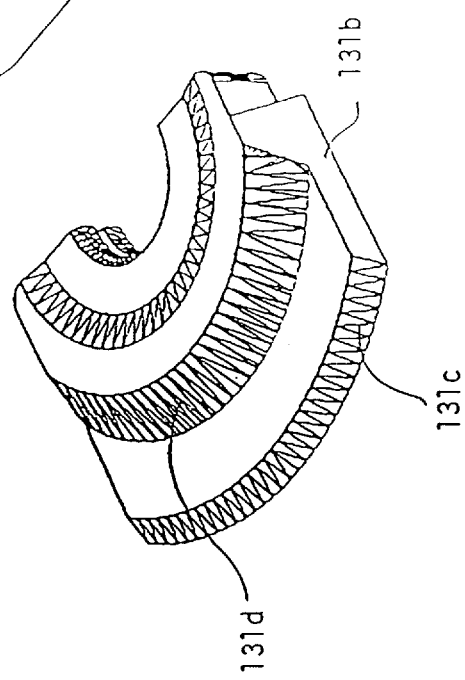

Setting up, pumping, use and bag replacement is now described. The spout 2, 3 of the bag 1 is fitted to the lid 131 of the bag holder. For this purpose, as best seen in FIG. 7, the lid 131 is formed in two parts, main part 131a and smaller part 131b which may be slidingly fitted together to provide a collar which engages the spout 2, 3. The lid 131 with the bag 1 depending or hanging therefrom is then placed in position on top of the cylindrical side wall 130 and then secured in position by means of bolts 132. It will be seen that the bevelled upper internal rim 130a of the cylindrical side wall co-operates with a corresponding bevelled outer lower rim 131c of the two parts of the lid 131.

As with the embodiment illustrated FIGS. 1 to 5, the valve is then moved downwardly, and the drive mechanism 135, 136 is activated to exert pressure on the bag 1 corresponding to the total pressure exerted in the embodiment of FIGS. 1 to 5. The apparatus is then primed and used in the same manner as for the embodiment of FIGS. 1 to 5. Bag replacement is also carried out in the same manner as for the embodiment of FIGS. 1 to 5 except that pressure reduction involves just the single step of lowering the moveable floor 134 and removal of the empty bag involves undoing bolts 132, removing lid 131, and dividing the latter into its component parts 131a and 131b. The outlet valve 10 is identical to that of the embodiment of FIGS. 1 to 5.

Attention is drawn to the shape of the upper surface of the moveable floor 134. It will be seen that at the outer edge there is an annular depression 134a which rises to an annular cusp 134b. This contour serves a double function. Firstly, as best seen in FIG. 6B, when the moveable floor 134 is in the fully raised position, the annular depression co-operates with a corresponding shoulder 131d on the lower surface of the lid 131 to define an annular chamber for accommodating the folds of the empty bag 1. Secondly, as best seen in FIG. 6A, the upward curve leading to the cusp 134b is intended to provide a corresponding bag contour so as to minimize the risk of a fold of the bag descending into the gap between the outer edge of moveable floor 134 and the cylindrical side wall 130.

Figure 8:
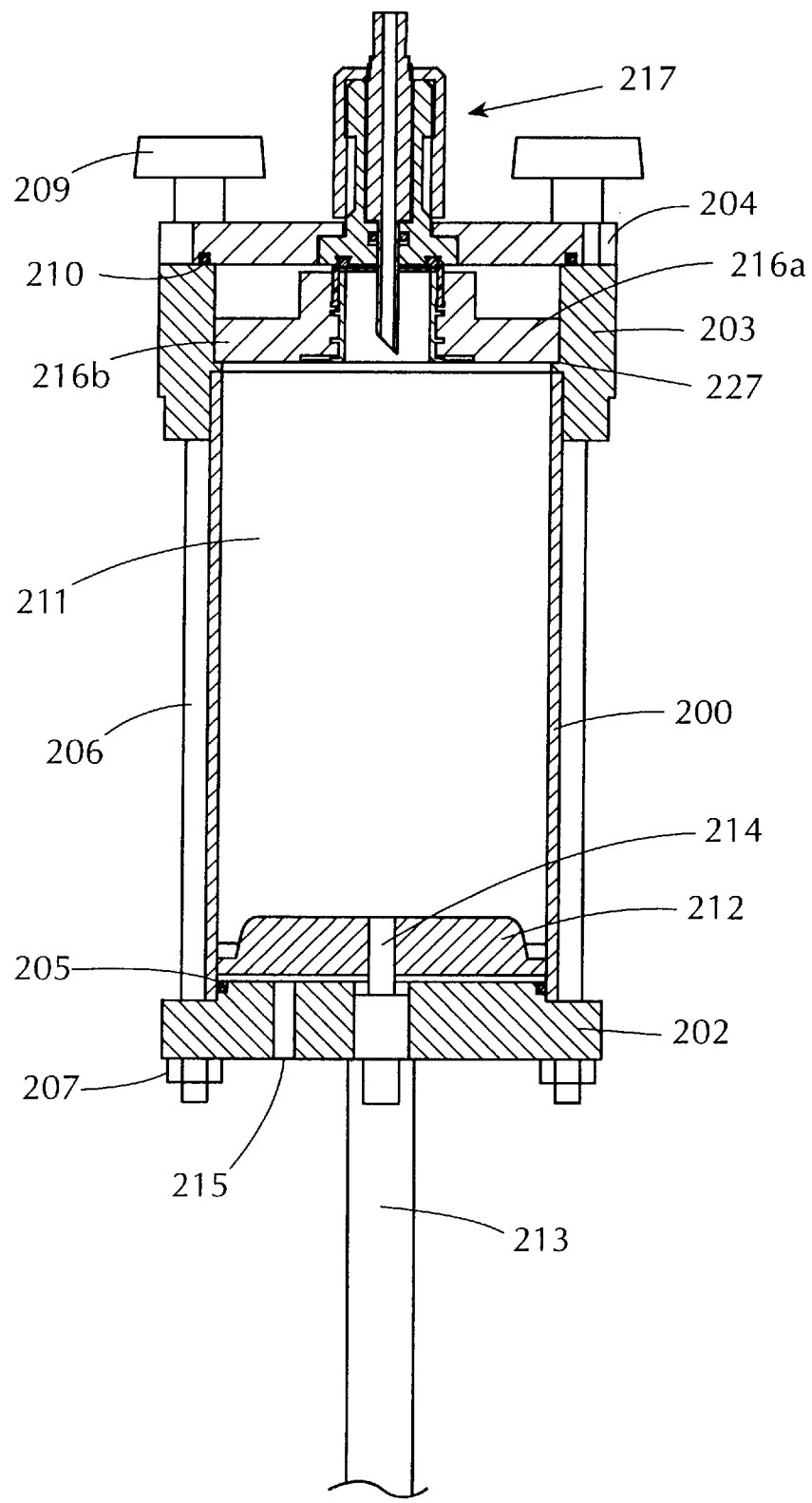
FIG. 8 is a sectional front elevation of a third embodiment of a pressure mechanism in accordance with the present invention.

The embodiment shown in FIG. 8 is an alternative to that shown in FIG. 1 with the housing or bag holder itself comprising the pressure pot, this embodiment being of simpler construction than that shown in FIG. 1.

The bag holder includes side walls 200 which together define a tube 201, a base plate 202, a top plate 203 and a lid 204. The tube 201 is bonded at one end to the top plate 203 to create an airtight seal, while the base plate 202 mates with the other end of the tube 201 and is sealed with an O-ring 205. The base plate 202 and the lid 204 are fastenable together by means of four tie rods 206 and four nuts 207. The tie rods 206 are screwed into the top plate 203 and pass through holes in the base plate 202 and are secured by the nuts 207 under the base plate 202. The lid 204 is screwed onto the device by four knobs 209. The tie rods 206 are arranged so that they protrude sufficiently above the top plate 203 so that they can be used as studs. The knobs 209 are screwed onto the studs or tie rods 206. The lid 204 is sealed to the top plate 203 with an O-ring 210.

Walls 200, the lid 204 and the base plate 202 together define a cavity 211 into which the bag may be placed. The cavity 211 is provided with a moveable floor 212 which is a floor drive mechanism consisting of floor 212, a pneumatic cylinder 213, and a piston rod 214. The pneumatic cylinder 213 is screwed onto the base plate 202 and sealed using a thread sealer (available from Loctite Ireland Limited, Whitestown Industrial Estate, Dublin 24, Ireland). The moveable floor 212 is a close fit to the inside diameter of the tube 201 which prevents the bag snagging on the floor 212 as the floor moves inside the tube 201 and also prevents the bag extruding out between the tube 201 and the floor 212. However, the floor 212 and tube 201 do not form an air-tight seal and the air pressure will equalise on both sides of the floor 212 in use. The bottom plate 202 is also provided with an air connection 215 which is connected to a valve (not shown) which directs air in or out of the housing. The valve in turn is connectable with a source of air pressure in a manner well known for pressure vessels. The source of air pressure regulates the air pressure to a pressure appropriate to dispense the contents of the bag.

The upper end of the housing or bag holder is provided with a spout holder 216 which retains the spout of the bag in a position in which it is connectable with an outlet valve generally designated 217. If the dispenser is to be used with air-activated adhesives then a spout, plug and connector of the type shown in FIG. 2A could be used. For air sensitive adhesives the spout holder shown in FIGS. 8, 9 and 10 may be employed. The spout holder is formed from two parts 216a and 216b which fit around the spout 224 of the adhesive bag. The spout 224 of the bag is closed with a screw-cap 225. Each part 216a and 216b is provided with a ledge 226 which supports the spout 224. In turn, the spout holding parts 216a and 216b rest on a lip 227 on the top plate 203. In this embodiment the parts 216a and 216b are not a sliding fit but simply abut each other to retain the spout. This construction has the advantage that spilled adhesive is less likely to bond the two parts together.

Figure 9:
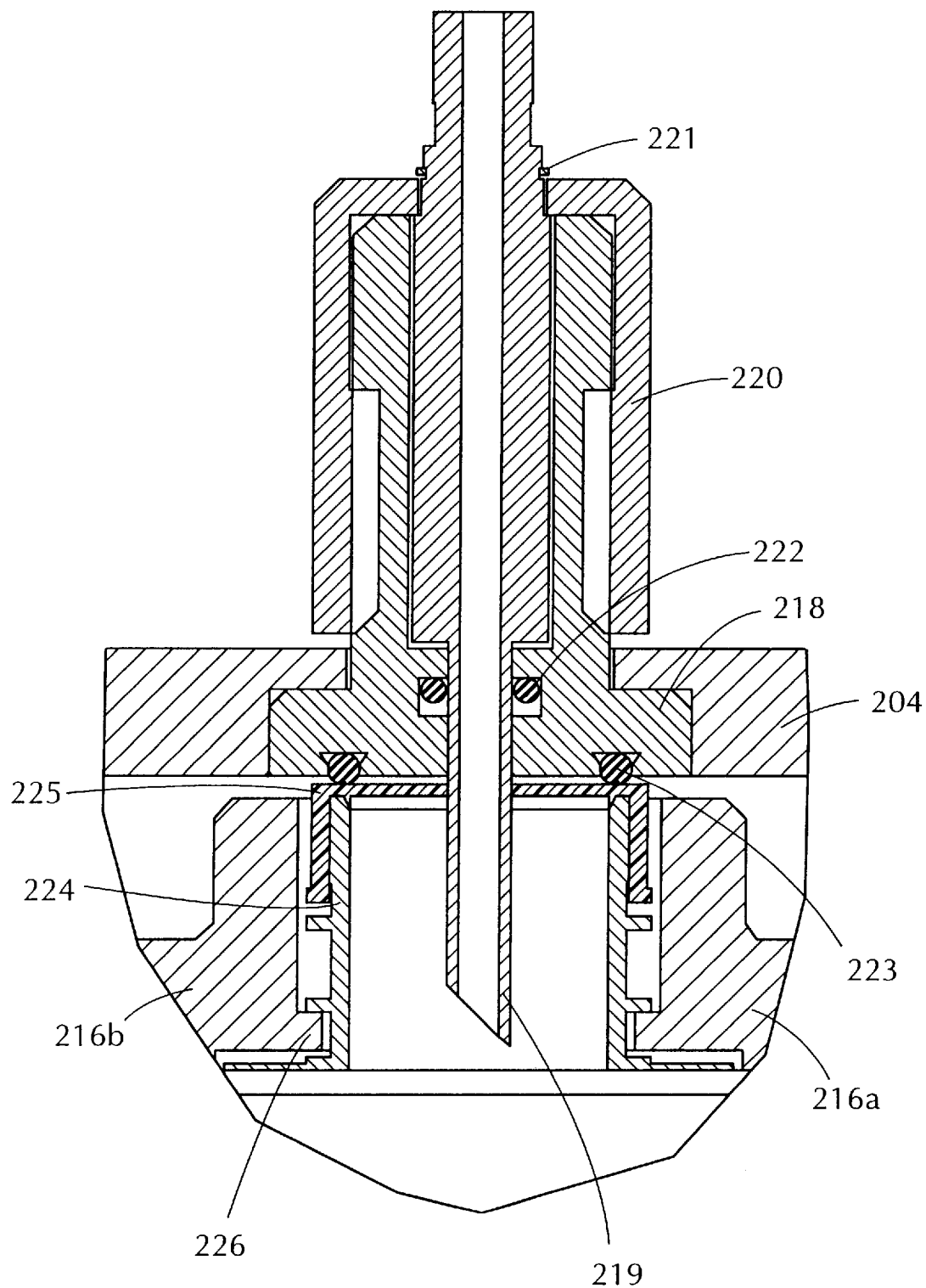
FIG. 9 is a detail of FIG. 8 on a much larger scale showing the spout retaining means and the spout piercing means in greater detail.

The outlet valve 217 is shown in greater detail in FIG. 9. This embodiment relates to a connector of a type suitable for use with a non-air sensitive product. The valve connector 217 has three main elements, an insert 218, a piercing element 219 and a screw collar 220. The insert 218 is sealed and bonded into the lid 204. The screw collar 220 can be screwed onto the insert 218 so that the piercing element 219 is moved up and down. By moving the piercing element 219 downwards the cap of the adhesive bag is pierced. A circlip 221 provided on the piercing element 219 causes the piercing element to retract when the collar 220 is screwed upwards. The piercing element 219 is sealed to the insert 218 with an O-ring 222. The lid 204 is sealed to the cap of the adhesive bag with an O-ring 223. In the particular embodiment shown in FIG. 8, the O-ring 223 is located in the insert 218 but it does not have to be formed in this way. The O-ring 223 seals the product from the pressure vessel. The lid 204, therefore, has two O-rings, the larger one 223 seals the lid 204 to the top plate 203 and the smaller one 222 seals in the product within the package.

Figure 11:
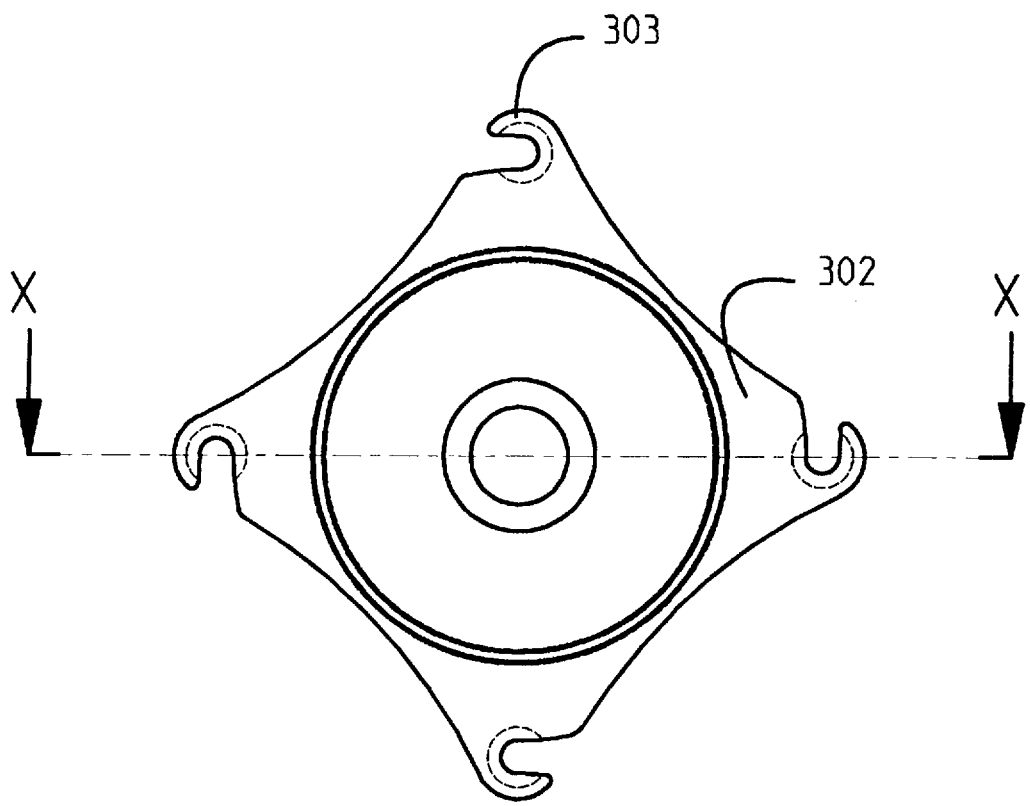
FIG. 11 is a perspective view of a lid for use with the pressure mechanism.
Figure 12:
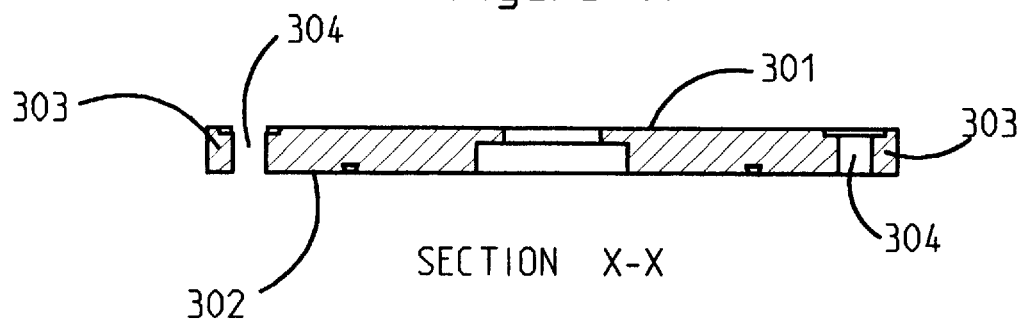
FIG. 12 is a plan view of the lid showing the lower face.
Figure 13:
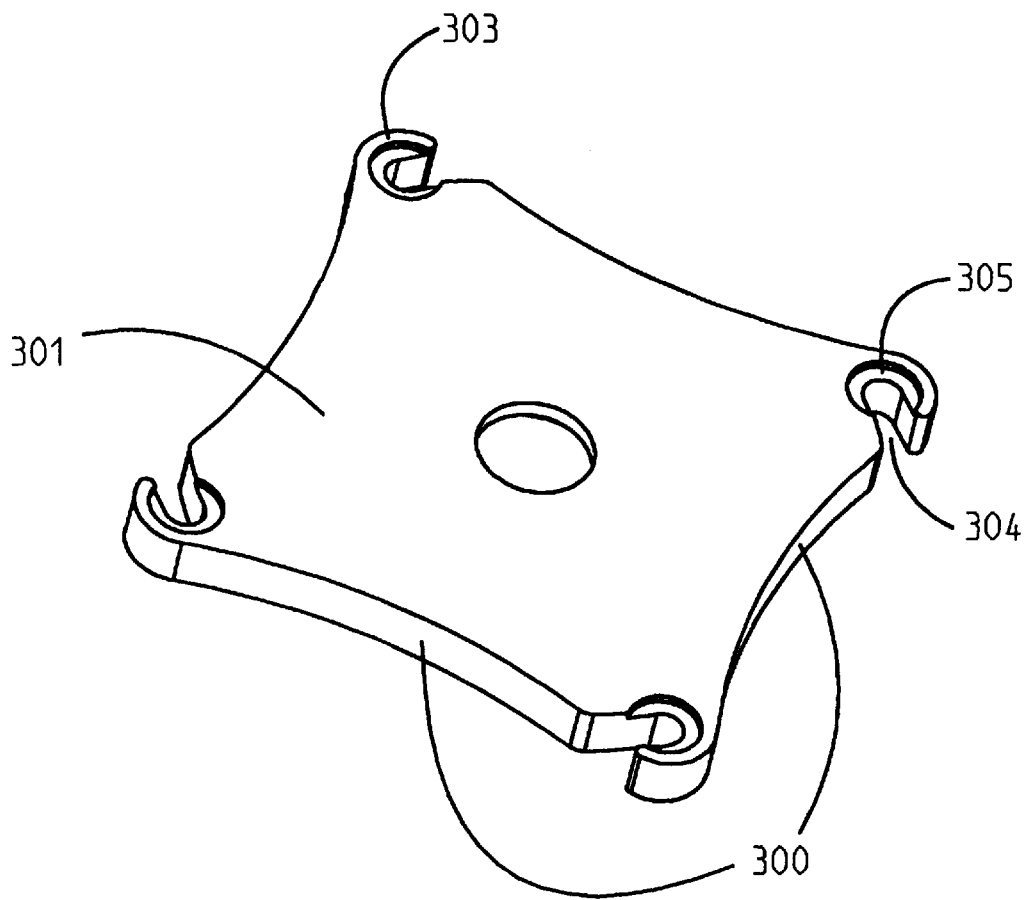
FIG. 13 is a section along the line marked X—X in FIG. 11.

An embodiment of a lid for use in fluid pressure mechanisms of the type described herein is shown in FIGS. 11, 12 and 13. It is, however, understood that this lid is generally suitable for use with product tanks and does away with the need for swing bolts.

Figure 10:
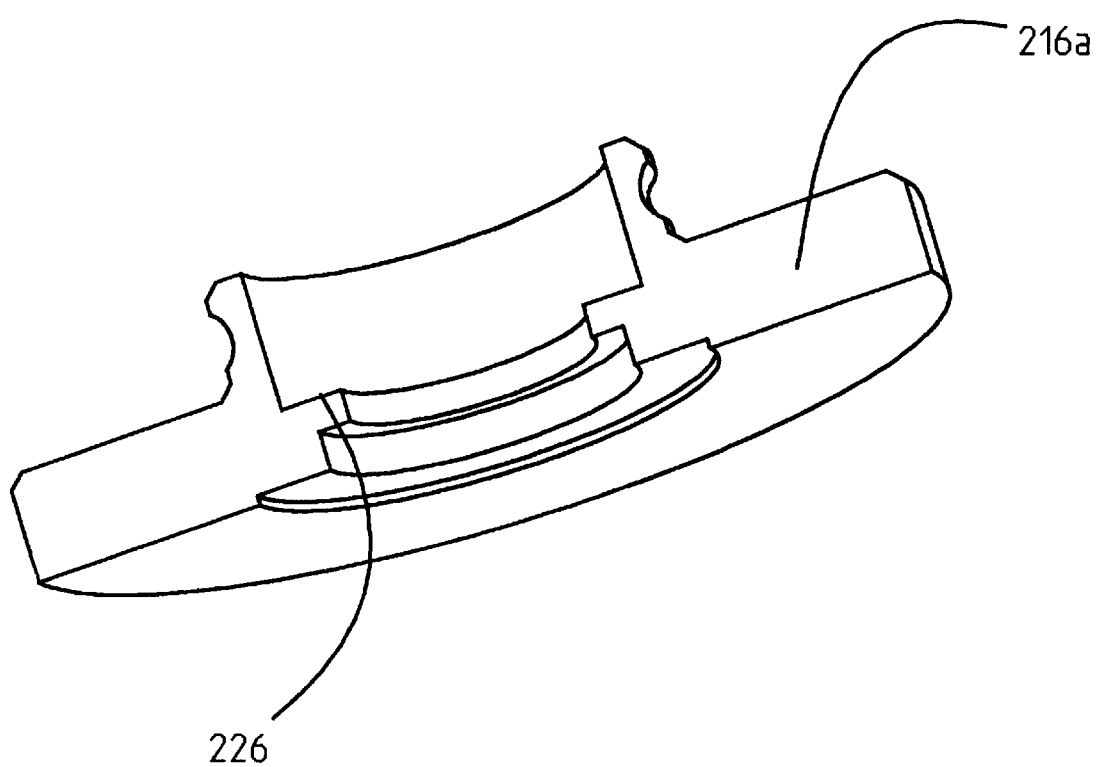
FIG. 10 is a perspective view of one half of a second embodiment of the spout retaining means.

The lid shown in FIGS. 10, 11 and 12 has four sides 300, an upper face 301 and a lower face 302. The sides 300 are not straight, but instead are generally curved inwardly towards the centre of the lid so that each side 300 is concave. Each corner of the lid is provided with a hook-shaped ring 303 which defines a slot or opening 304 in each side 300 adjacent the corner. Each slot 304 is curved about its circumference. The upper face 301 of the lid is provided with a recess 305 about each slot 304.

The fluid pressure mechanism is provided with four studs each of which can be retained within one of the hook-shaped wings 303 and fastened in place by a knob or nut which fits within the recess 305. The knobs are numbered 24, 132 and 209 in FIGS. 1, 6A and 8 respectively.

To open the lid, the knobs or nuts are loosened until they are free of the recesses 305. The lid is rotated anticlockwise, through about 45° until the studs no longer lie within the hook-shaped wings 303. The lid can then be lifted clear of the knobs since the concave sides 300 of the device do not provide an obstruction to the knobs as the lid is raised and removed from the product tank.

The lid is thus simpler to use than one which employs swing bolts and also does away with the necessity to remove nuts or knobs from simple studs which prevent them from becoming lost.

To use the dispenser the two halves of the spout holder 216a and 216b are assembled around the spout 224. The bag of adhesive is then lifted into the cavity 211 in the dispenser by holding the two spout holders 216a and 216b together. The holders are then placed on the lip 227 on the top plate 203. The lid 204 is then assembled and locked down using the knobs 209. The screw collar 220 is then screwed down, piercing the cap. The air pressure is switched on and the pneumatic cylinder 213 is energised. The air is introduced in the pressure vessel through the air connection 211.

The bag is removed by reversing the above operation.

Standard magnetically activated limit switches can be attached to the pneumatic cylinder to indicate when the bag is low or empty of product.

The present invention has been illustrated above, but is not to be so limited. The spirit and scope of this invention shall only be limited by the claims.

What is claimed is:

1. A disconnectable flow connector for connecting a fluid-containing flexible bag (1) to a fluid supply line (100) comprising in combination:

a spout (2, 3) for mounting on the flexible bag (1);

a valve (10) of the kind comprising a valve housing (11) and plunger (14), for mounting on the end of the fluid supply line (100);

sealing means for providing a seal between the valve housing and spout (2, 3);

fluid communication means to allow fluid communication between the interior of the flexible bag (1) and the interior of the valve housing (11);

characterized in that the spout (2, 3) includes a membrane (5) which is pierceable to allow fluid communication with the interior of the flexible bag (1);

the valve (10) has a tip (15) capable of piercing the membrane (5) upon movement of the valve (10) into the spout (2, 3);

the valve housing (11) has a tapering end (12) which can seal the pierced membrane (5) and has an aperture (13) at said end to allow fluid to flow from the flexible bag (1) into the valve housing (11);

the valve plunger (14) is movable between a forward closed position in which it plugs the aperture (13) thus preventing fluid from entering the valve housing (14) and an open retracted position in which it allows fluid to enter the valve housing (14);

and valve plunger activation means (16) are provided which may be operated independently of the relative movement or position of the valve (10) and spout (2, 3).

2. A flow connector according to claim 1 characterized in that the membrane (5) includes a weakened portion or weakness (5a) to facilitate piercing.

3. A flow connector according to claim 1 characterized in that the membrane (5) includes a hinge (5b) so that on being pierced the elements of the pierced membrane (5) are deflected towards the interior of the bag (1).

4. A flow connector according to claim 1 characterized in that the valve plunger (14) includes the tip (15) which in the closed position projects through the aperture (13) at the end of the valve housing (11).

5. A flow connector according to claim 1 characterized in that the tapering end (12) of the valve (10) is conical and the spout (2, 3) includes a conical seat (4) for the end (12) of the valve (10) with the membrane (5) extending across the base of the seat (4), the angle of taper of the seat (4) being very slightly greater than the angle of taper of the end (12) of the valve (10).

6. A flow connector according to claim 1, further comprising a lid for a product tank through an opening of which connects the fluid-containing flexible bag (1) to the fluid supply line (100), the lid being engageable with a plurality of studs comprising an upper face (301), a lower face (302) and a plurality of sides (300) characterized in that the sides (300) are concave and that the intersection of the sides defines a corner of the lid, each corner being provided with a hook-shaped ring (303) which defines a slot (304) into which the studs are receivable.

7. A flow connector according to claim 1, further comprising a fluid pressure mechanism for driving fluid contents from the bag (1) having the spout, the mechanism comprising a housing (130) for the bag (1), a spout retaining means, a spout piercing means (219) and a pressure application means (134) for applying external pressure to the outer surface of the bag in the housing.

8. A flow connector according to claim 7, further comprising a lid for a product tank through an opening of which connects the fluid-containing flexible bag (1) to the fluid supply line (100), the lid being engageable with a plurality of studs comprising an upper face (301), a lower face (302) and a plurality of sides (300) characterized in that the sides (300) are concave and that the intersection of the sides defines a corner of the lid, each corner being provided with a hook-shaped ring (303) which defines a slot (304) into which the studs are receivable.

* * * * *